(12) United States Patent
Höglund et al.

(10) Patent No.: US 10,952,183 B2
(45) Date of Patent: Mar. 16, 2021

(54) PAGING CARRIER ASSIGNMENT FOR NARROWBAND RADIO COMMUNICATION SYSTEM

(71) Applicant: Telefonaktiebolaget LM Ericsson (publ), Stockholm (SE)

(72) Inventors: Andreas Höglund, Solna (SE); Ali Nader, Malmö (SE); Oscar Ohlsson, Stockholm (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,866

(22) PCT Filed: Oct. 4, 2017

(86) PCT No.: PCT/EP2017/075268
§ 371 (c)(1),
(2) Date: Apr. 2, 2019

(87) PCT Pub. No.: WO2018/065498
PCT Pub. Date: Apr. 12, 2018

(65) Prior Publication Data
US 2020/0154393 A1    May 14, 2020

(51) Int. Cl.
*H04W 68/02* (2009.01)
*H04W 68/00* (2009.01)
*H04W 68/08* (2009.01)
*H04W 68/12* (2009.01)

(52) U.S. Cl.
CPC ......... *H04W 68/02* (2013.01); *H04W 68/005* (2013.01); *H04W 68/08* (2013.01); *H04W 68/12* (2013.01)

(58) Field of Classification Search
CPC ... H04W 68/02; H04W 68/005; H04W 68/08; H04W 68/12
See application file for complete search history.

(56) References Cited

U.S. PATENT DOCUMENTS

2019/0342852 A1\* 11/2019 Marco ................... H04W 68/02

OTHER PUBLICATIONS

Zte, "Considerations to support paging on multiple PRBs", 3GPP TSG RAN WG1 Meeting #86, Gothenburg, Sweden, Aug. 22, 2016, pp. 1-3, R1-167326, 3GPP.

(Continued)

*Primary Examiner* — Marisol Figueroa
(74) *Attorney, Agent, or Firm* — Coats + Bennett, PLLC

(57) ABSTRACT

The invention proposes a user equipment, UE, configuring a paging carrier, wherein the UE performs the steps of monitoring a first paging carrier for paging messages, receiving a message from a network node, the message comprising paging carrier information indicating a second paging carrier selected by the network node or a further network node, wherein the second paging carrier is different from the first paging carrier, and in response to receiving the message, monitoring the second paging carrier for paging messages; further the invention proposes corresponding network nodes; further the invention proposes corresponding methods for the UE and the network nodes.

15 Claims, 9 Drawing Sheets

(56) References Cited

OTHER PUBLICATIONS

Ericsson, "Summary of email discussion [95#41][eNB-IoTenh] Paging open issues", 3GPP TSG-RAN WG2 #95bis, Kaohsiung, Taiwan, Oct. 10, 2016, pp. 1-14, Tdoc R2-166278, 3GPP.
Ericsson, "Non-anchor carrier Paging in NB-IoT", 3GPP TSG-RAN WG2 #95bis, Kaohsiung, Taiwan, Oct. 10, 2016, pp. 1-6, Tdoc R2-166279, 3GPP.
Zte, "Consideration for paging on multi-carrier in NB-IoT", 3GPP TSG-RAN WG2 Meeting#95, Gothenburg, Sweden, Aug. 22, 2016, pp. 1-3, R2-164858, 3GPP.

* cited by examiner

PAGING CARRIER ASSIGNMENT FOR NARROWBAND RADIO COMMUNICATION SYSTEM

TECHNICAL FIELD

Disclosed herein are embodiments for a paging carrier assignment, and specifically embodiments using dedicated signaling to reconfigure the distribution of UEs over paging carriers.

BACKGROUND

Narrowband radio communication systems, also being referred to as Internet of Things (NB-IoT), is a narrowband (NB) system developed for cellular UEs or IoT-UEs by the 3rd Generation Partnership Project (3GPP). The system is based on existing Long Term Evolution (LTE) systems and addresses optimized network architecture and improved indoor coverage for a massive number of devices that may have one or more of the following characteristics: low throughput devices (e.g., 2 kbps), low delay sensitivity (e.g., 10 seconds), ultra-low device cost (e.g., below $5.00), and low device power consumption (e.g., battery life of 10 years).

Each cell (e.g., approximately 1 kilometer$^2$ in this system) may serve thousands (e.g., 50 thousand) devices such as sensors, meters, actuators, and the like. In order to be able to make use of the existing spectrum, e.g. for Global System for Mobile Communications (GSM), a fairly narrow bandwidth has currently been adopted for NB-IoT technology, such as the 180 KHz bandwidth as used for the LTE Physical Resource Block (PRB). The entire NB-IoT is contained within 200 KHz or one PRB, i.e., 12 subcarriers of 15 kHz each. In NB-IoT, this may be referred to as one carrier or one PRB.

For Frequency Division Duplex (FDD) mode of NB-IoT (i.e., the transmitter and the receiver operate at different carrier frequencies) only half-duplex mode needs to be supported in the user equipment (UE). In order to achieve improved coverage, data repetition is used in the uplink (UL) and/or the downlink (DL). The lower complexity of the devices (e.g., only one transmission/receiver chain) means that some repetition may also be needed in normal coverage. Additionally, to alleviate UE complexity, the working assumption is to have cross-subframe scheduling. That is, a transmission is first scheduled on a Narrowband Physical DL Control Channel (NPDCCH) and then the first transmission of the actual data on the Narrowband Physical DL Shared Channel (NPDSCH) is carried out after the first transmission on the NPDCCH. Similarly, for UL data transmission, information about resources scheduled by the Network (NW) and needed for the UE for UL transmission is first conveyed on the NPDCCH and then the first transmission of the actual data by the UE on the Narrowband Physical UL Shared Channel (NPUSCH) is carried out after the final transmission of the NPDCCH. Thus, for both cases, there is no simultaneous reception of control channel and reception/transmission of data channel from the UE's perspective.

Furthermore, not all of the subframes may be available for dedicated data communication in the DL in an NB-IoT cell. The amount of available subframes in the DL may be dependent on one of the three operation modes NB-IoT is deployed in (i.e., Stand-alone, In-band, and Guard-band).

For all operation modes, a UE needs to rate-match around the following non-available subframes (or parts of subframes):

The NB-IoT primary and secondary synchronization channels (NB Primary Synchronization Signal, NPSS, and NB Secondary Synchronization Signal, NSSS), where NPSS is transmitted every radio frame. The NB-IoT radio frame length is the same as in LTE, i.e., 10 ms and consists of 10 subframes. NPSS is transmitted in subframe number 5; However, NSSS transmission cycle is still to be defined in 3GPP;

The NB-IoT broadcast channel (NPBCH) containing a Master Information Block (MIB) occupying subframe 0 in every radio frame;

The NB-IoT system information blocks broadcast on NB physical downlink shared channel (NPDSCH) (e.g., SIB1-NB broadcast in fourth subframe of every other radio frame);

DL gaps, when configured;

NB-IoT reference symbols (NRS); and in addition in the case in-band operation mode: LTE reference symbols such as cell reference symbols (CRS) and positioning reference signals (PRS), and LTE Multimedia Broadcast Single Frequency Network (MBSFN) subframes.

Due to the nature of NB-IoT with half-duplex communication, cross-subframe scheduling, low bandwidth, the available amount of subframes, and the amount of UEs to be served, it becomes evident that, as all other communications systems, NB-IoT will naturally benefit from utilizing more spectrum for efficient operation, especially if such spectrum is already available (e.g., in an in-band operation mode during low traffic hours when LTE carrier is not fully used). Therefore, in 3GPP Release 13, NB-IoT multi-carrier operation has been adopted where the UE operating in an NB-IoT anchor carrier is configured through higher layer signaling (Layer 3 Radio Resource Control (RRC)) to operate in an NB-IoT non-anchor carrier during connected mode operation. The non-anchor carrier does not have the requirement to be deployed on the 100 kHz raster, i.e., any LTE in-band PRB can be used as non-anchor. At the end of the connected mode operation, the UE autonomously returns back to the anchor carrier.

SUMMARY

It is an object of the present invention to provide an improved paging carrier distribution.

This object is achieved by the independent claims. Advantageous embodiments are described in the dependent claims and by the following description.

As an embodiment, a method in a network node for assigning to a user equipment, UE, a paging carrier is disclosed, wherein the UE is configured to monitor a first paging carrier, the method comprising:

the network node determining whether the UE should be configured to monitor a paging carrier different than the first paging carrier, or receiving a paging request from a further network node, the paging request being indicative of a paging carrier different than the first paging carrier;

as a result of determining that the UE should be configured to monitor a paging carrier different than the first paging carrier, the network node selecting a second paging carrier; and, after selecting the second paging carrier:

the network node transmitting towards the UE a message comprising paging carrier information indicating the selected second paging carrier.

As a further embodiment, a method in a user equipment, UE for configuring a paging carrier is disclosed, the method comprising:
the UE monitoring a first paging carrier for paging messages;
the UE receiving a message from a network node, the message comprising paging carrier information indicating a second paging carrier selected by the network node or another network node, the second paging carrier being different than the first paging carrier; and
in response to receiving the message, the UE monitoring the second paging carrier for paging messages.

As a further embodiment, a method in a network node for paging a user equipment, UE, on a paging carrier selected by a further network node is disclosed, the method comprising:
receiving paging information transmitted by a further network node, the paging information comprising paging carrier information indicating a paging carrier selected by the further network node;
after receiving the paging information, generating a paging request for paging the UE, said paging request comprising the paging carrier information received earlier from the further network node; and
transmitting to further network node the paging message comprising the paging carrier information.

As further embodiment, a network node is disclosed, the network node comprising processing circuitry configured to perform the following steps:
determining whether the UE should be configured to monitor a paging carrier different than the first paging carrier, or receiving a paging request from a further network node, the paging request being indicative of a paging carrier different than the first paging carrier;
selecting a second paging carrier; and
transmitting towards the UE a message comprising paging carrier information indicating the selected second paging carrier.

As further embodiment, a user equipment, UE, is disclosed, the UE comprising comprising processing circuitry configured to perform or initiate the following steps:
monitoring a first paging carrier for paging messages;
obtaining paging carrier information from a message from a network node (110), the paging carrier information indicating a second paging carrier selected by the network node or a further network node, the second paging carrier being different from the first paging carrier; and
changing from monitoring the first paging carrier to monitoring the second paging carrier for paging messages.

As further embodiment, a network node is disclosed, the network node comprising processing circuitry configured to perform the following steps:
the network node comprising processing circuitry configured to perform the following steps:
receiving paging information transmitted by a further network node, the paging information comprising paging carrier information indicating a paging carrier selected by the further network node;
after receiving the paging information, generating a paging request for paging the UE, said paging request comprising the paging carrier information received earlier from the further network node; and
transmitting to further network node the paging message comprising the paging carrier information.

BRIEF DESCRIPTION OF THE DRAWINGS

The accompanying drawings, which are incorporated herein and form part of the specification, illustrate various embodiments.

DETAILED DESCRIPTION

Figure 1:
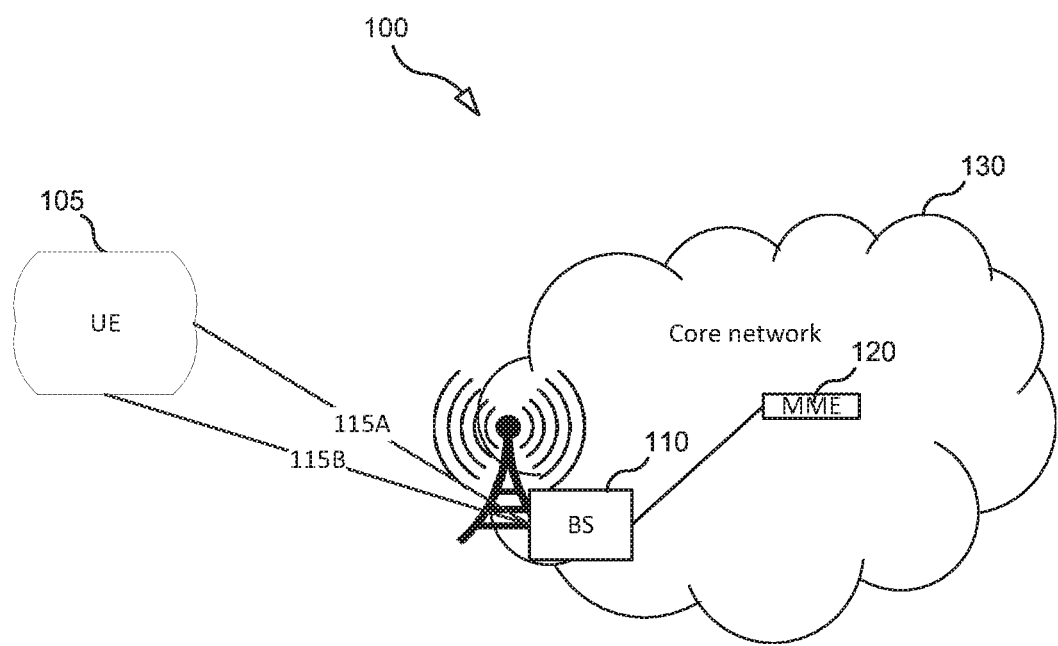
FIG. 1 illustrates an exemplary Narrowband Internet of Things (NB-IoT) wireless communications system according to some embodiments.

It has been proposed to extend the multi-carrier operation such that UEs shall be able to both monitor paging and perform Random Access on non-anchor carriers. One option is to reuse the enhanced Machine Type Communication (eMTC) for evenly distributing UEs over all possible paging carriers, including both anchor and non-anchors, based on UE identifiers (UE_ID). However, unlike eMTC, in which there are no qualitative differences between the narrowbands (i.e., 6 PRB regions in the frequency domain), the NB-IoT carriers/PRBs can be quite different. For example, paging on certain carriers can be beneficial due to 1) DL power boosting, 2) deployment mode: In-band, guard-band, or stand-alone (e.g., higher DL power, lack of legacy CRS, PRCS, MBSFN, and PDCCH), and 3) anchor or non-anchor carrier (presence of NPSS/NSSS, NPBCH, System Information (SI) and 3GPP Release 13 UEs). As a result of these differences, UEs in higher levels of Coverage Enhancement (CE) can be appointed paging carriers that are unfavorable and therefore require unnecessarily high numbers of repetitions which will have a negative impact on battery life.

According to current 3GPP NB-IoT specifications, there are 3 CE levels applicable to random access. The UE measures its downlink and compared the level with eNB broadcast thresholds and concludes which CE level it is in.

It is to be noted that the CE levels are only applicable to the initial connection attempt. Afterwards, the eNB controls the actual amount of repetitions on a much finer granularity than these 3 levels. In the context of the present invention, the corresponding information (UEPagingCoverageInformation-NB) may comprise actual repetitions (npdcch-Num-RepetitionPaging (as discussed e.g. in 3GPP TS 36.331).

To address at least some of these issues, according to some embodiments, a mechanism is provided to override the default distribution of UEs over paging carriers based on UE_ID by means of dedicated signaling. Such a mechanism may allow for the network to direct certain UEs, such as those in high CE-levels, to monitor paging in dedicated carriers that are more beneficial to them. This solution may be implemented, for example, when providing a dedicated configuration to the UE in Msg4 (i.e. RRC Connection Setup), as a reconfiguration under ongoing RRC Connection session (e.g., RRC Connection Reconfiguration), when the UE is released to Idle (e.g., a RRC Connection Release), a connection resume (e.g., RRC Connection Resume), or a connection re-establishment (e.g., RRC Connection Re-establishment). The solution may be applicable to UEs remaining in the same cell and the paging assignment may not be valid in any other cell.

One advantage of the solution, according to some embodiments, is to enable network control as to which carrier a UE will monitor paging. This may be useful for a wide range of needs, from load distribution to future needs, but one application targeted here is to reduce the number of repetitions needed for UEs in high CE. For example, this could be effectively used to put high CE UEs on power boosted DL carriers to improve the 5%-percentile of the UE power consumption in the system, which will likely be the main key performance indicator used for battery life evaluations. As another example, one advantage of the solution is the base station (e.g., Evolved Node B (eNB)) may always know which carrier a UE is monitoring paging occasions (POs) in and can, in principle, always reach the UE when paging with the maximum number of configured repetitions. Additionally, another advantage of the solution is a simple add-on to UE-ID based distribution that provides the benefits of individual UE configuration. Yet another advantage of the solution is that it may provide full network control if paging distribution is to be done on another basis than CE-level later on. According to one aspect of the present invention a method in a first network node (e.g., an eNB, MME, etc.) for assigning to a user equipment (UE) a paging carrier is provided. The method comprises: the first network node determining whether the UE should be configured to monitor a paging carrier different than a first paging carrier; as a result of determining that the UE should be configured to monitor a paging carrier different than the first paging carrier, the first network node selecting a second paging carrier; and after selecting the second paging carrier: the first network node transmitting towards the UE a first message comprising paging carrier information (e.g., a paging carrier index, absolute frequency position) indicating the selected second paging carrier.

In some embodiments, the method further comprises receiving a connection message (e.g., an RRC Connection Request, RRC Connection Resume Request, RRC Connection Re-establishment Request) transmitted by the UE, and the determining step is performed in response to receiving the connection message. In some embodiments, the first message is one of: a connection setup message (e.g., an RRC Connection Setup), a connection reconfiguration message (e.g., RRC Connection Reconfiguration), a message for causing the UE to re-establish a connection (e.g. RRC Connection Re-establishment), a connection resume message (e.g., RRC Connection Resume), a message for causing the UE to transition to an idle state (e.g., an RRC Connection Release), and a page for the UE.

In some embodiments, after selecting the second paging carrier, the first network node transmits to a second network node (e.g., an MME) a second message comprising paging carrier information indicating the selected second paging carrier. In some embodiments, the second message is a message for conveying UE paging coverage information (e.g., a UEpagingcoverageinformation-NB message. In some embodiments, the second message is one of a UE CONTEXT RELEASE COMPLETE, a UE CONTEXT SUSPEND REQUEST, or a paging message. In some embodiments, the second message comprises an information element (IE) for storing information indicating an (estimated) number of repetitions for NPDCCH messages for paging (e.g. npdcch-NumRepetitionPaging-r13 IE), and the paging carrier information is included in said IE. In some embodiments, wherein the IE encodes both the number of repetitions and the paging carrier information. In some embodiments, the IE consists of a set of 11 bits, a first subset of the 11 bits (e.g., 4 bits of the 11 bits) is used to encode the number of repetitions, and a second subset of the 11 bits (e.g., a different 4 bits of the 11 bits) is used to encode the paging carrier information. In some embodiments, the second message comprises: a first information element (IE) for storing information indicating an (estimated) number of repetitions for NPDCCH messages for paging (e.g. npdcch-NumRepetitionPaging-r13 IE), and a second IE distinct from the first IE for storing the paging carrier information.

In some embodiments, the method further comprises: the first network node receiving a paging request transmitted by the second network node, the paging request comprising the paging carrier information that was transmitted to the second network node; the first network node extracting from the paging request the paging carrier information; and the first network node paging the UE using the paging carrier indicated by the extracted paging carrier information (e.g., the first network node transmits a paging message on a downlink control channel (e.g., NPDSCH) on the indicated carrier). In some embodiments, the paging request is a PAGING message.

In some embodiments, the first network node is a base station node (e.g., an eNB). In some embodiments, the first network node storing the paging carrier information. In some embodiments, the method further comprises: receiving a paging message for the UE; and, retrieving the stored paging carrier information based on a UE identifier included in the paging message.

In some embodiments, the first network node is a Mobility Management Entity (MME) node, and the step of transmitting towards the UE comprises the MME transmitting the first message to a base station node for forwarding to the UE.

In some embodiments, the determining is based on one or more of the following: downlink power boosting applied for a carrier, whether a carrier is a non-anchor or anchor carrier, whether the carrier is in-band, guard-band or stand-alone, a coverage or repetition level of the UE, a category of the UE, a capability of the UE, a history of the UE, a statistic of the UE, a current load situation on downlink carriers, a current distribution of one or more UEs over carriers, and an identifier of the UE. In some embodiments, the determining is based on a level of coverage enhancement (CE).

In some embodiments, the first message further comprises an indication as to a set of one or more cells the paging carrier information is valid.

According to another aspect, a method in a user equipment (UE) is provided for configuring a paging carrier. The method comprises: the UE monitoring a first paging carrier (e.g., a paging carrier selected by the UE) for paging messages; the UE receiving a first message from a network node, the first message comprising paging carrier information indicating a second paging carrier selected by the network node, the second paging carrier being different than the first paging carrier; and in response to receiving the message, the UE monitoring the second paging carrier for paging messages.

In some embodiments, the method further comprises the UE, prior to receiving the first message, triggering the first network node to determine whether the first network node should select a second paging carrier for the UE. In some embodiments, the triggering step comprises the UE transmitting to the first network node a connection message (e.g., an RRC Connection Request), and the first message was transmitted by the first network node in response to the connection message.

In some embodiments, the first message is one of: a connection setup message (e.g., an RRC Connection Setup), a connection reconfiguration message (e.g., RRC Connection Reconfiguration), a message for causing the UE to transition to an idle state (e.g., an RRC Connection Release), and a page for the UE.

In some embodiments, the method further comprises selecting the first paging carrier based on an identifier of the UE. In some embodiments, the UE performs the selecting the first paging carrier.

In yet another aspect, a method in a first network node (e.g., an MME) for paging a user equipment (UE) on a paging carrier selected by a second network node (e.g., eNB) is provided. The method comprises: the first network node receiving paging information (e.g., a message containing UEpagingcoverageinformation-NB) transmitted by the second network node, the paging information comprising paging carrier information (e.g., a paging carrier index, absolute frequency position) indicating a paging carrier selected by the second network node; after receiving the paging information, generating a paging message for the UE, said paging message comprising the paging carrier information received from the second network node; and transmitting to the second network node the paging message comprising the paging carrier information received from the first network node.

In some embodiments, the paging information comprises an information element (IE) for storing information indicating an (estimated) number of repetitions for NPDCCH messages for paging (e.g. npdcch-NumRepetitionPaging-r13 IE), and the paging carrier information is included in the IE. In some embodiments the IE encodes both the number of repetitions and the paging carrier information. In some embodiments, the IE consists of a set of 11 bits, a first subset of the 11 bits (e.g., 4 bits of the 11 bits) is used to encode the number of repetitions, and a second subset of the 11 bits (e.g., a different 4 bits of the 11 bits) is used to encode the paging carrier information.

In some embodiments, the paging information is contained in a message, the message comprising: a first information element (IE) for storing information indicating an (estimated) number of repetitions for NPDCCH messages for paging (e.g. npdcch-NumRepetitionPaging-r13 IE), and a second IE (distinct from the first IE) for storing the paging carrier information.

In some embodiments, the paging information is contained in a message, wherein the message is a CONTEXT RELEASE Complete message or a UE CONEXT SUSPEND message.

It is likely that the eMTC way of distributing UEs uniformly over paging Narrowbands based on UE_ID will be reused for 3GPP Rel-14 NB-IoT (or some modification of it). While Narrowbands all have equal properties, NB-IoT carriers do not due to the following reasons: 1) DL power boosting, 2) deployment mode: In-band, guard-band or stand-alone (higher DL power+lack of legacy CRS and PDCCH), 3) anchor or non-anchor carrier (lack of NPSS/NSSS, NPBCH, SI and Rel-13 UEs).

Accordingly, it would be beneficial to have CE-level differentiated paging. CE-differentiated paging means that all carriers would not necessarily support paging in all CE-levels, and a UE in a certain CE-level would only select to monitor paging in one of the carriers which supports it. However, this solution becomes unnecessarily complex and has numerous drawbacks. This disclosure provides alternatives to this problem, giving the gains but fewer and less severe drawbacks.

One procedure, which could be an add-on on top of the eMTC solution, is for a network node (e.g., eNB) to select a paging carrier for certain UEs by means of a dedicated configuration to the UE in Msg4, as a re-configuration under ongoing RRC Connected session, when the UE is rejected, or when the UE is released/suspended to Idle mode (this is the preferred embodiment since the UE may have moved to better/worse coverage after Msg4), assign the UE to another paging carrier. This would allow for the network to direct certain UEs, typically those in high CE-levels, to monitor paging in carriers which are more beneficial to them. Overall this could improve battery life of UEs that have the worst battery life and therefore be good for any system requirements on battery life (i.e. NB-IoT meeting the mMTC 5G requirements).

The solution would be applicable to UEs remaining in the same cell since the paging assignment would not be valid in any other cell. (It is however unlikely that highly mobile UEs will constantly be in the highest CE-level).

One example of the procedure could be the following:

1. The UE selects it paging carrier over all available carriers based on UE_ID. For example, as explained in 3GPP technical specification (TS) 36.304, the NB may be selected in a similar manner as eMTC based on the following equation or a slightly altered version (e.g., UE_ID could be based on S-TMSI instead of IMSI, or a weighted non-uniform distribution): NB=floor(UE_ID/(N*Ns)) mod Nn.

2. The UE makes access to the cell and establishes a RRC connection, e.g., upon the arrival of data at the UE, the UE being paged, a Tracking Area Update (TAU) procedure, etc.

3. Based on certain selection criteria, the eNB may decide to re-configure the UE to another paging carrier (i.e., different to what the UE would have initially selected based on its UE_ID). By way of example, the selection criteria can be among the following:
   a. DL power boosting applied for the carriers.
   b. Which carriers are non-anchor and anchor carriers.
   c. Which carriers are In-band, guard-band and stand-alone.
   d. The coverage or repetition level of the UE.
   e. UE category and/or UE capabilities.
   f. UE history or statistics (e.g., based on RRC Resume context in eNB, MME provided info or similar).
   g. Current load situation on downlink carriers.
   h. Current UE distribution over carriers and/or UE_ID (eNB may want to collect UEs in the same coverage/repetition level or with the same PO/PF to be able to multiplex UEs in paging).

4. After deciding to re-configure the UE to another paging carrier, the eNB re-configures the UE to monitor paging in a certain downlink carrier which is different from the one selected in step 1 until further notice. This re-configuration may use a carrier index or an absolute frequency position and may be communicated to the UE in the following, for example by:
   a. Dedicated configuration to the UE in Msg4 (i.e., RRC Connection Setup);

b. Re-configuration under ongoing RRC Connected session (i.e., RRC Connection Reconfiguration);
c. When the UE is released to Idle (i.e., RRC Connection Release); and
d. A page request.

5. The eNB may further provide to the MME the paging carrier information together with the coverage information CE, e.g. in form of repetition number information (3GPP Rel-13, i.e., UEpagingcoverageinformation-NB).

6. The UE monitors paging by using the new configured downlink carrier selected by the eNB.

7. In following Connected sessions, the eNB may repeat steps 3-5 to re-configure the paging carrier for the UE again.

8. When the UE is paged in the same cell, the paging carrier information (e.g., carrier index, absolute frequency position) may be extracted from a paging request received by the eNB from the MME (the MME may store the information of step 5 with UE context. The eNB does not keep UE context when the UE is released in RRC IDLE (unless RRC suspend/resume is used); so, by providing this information back from MME to the eNB included in the paging request, the eNB is able to associate to restore the UE context).

9. The eNB pages the UE by transmitting NPDCCH, and the corresponding paging message on NPDSCH, on the downlink carrier for which the UE was configured and indicated in the paging request from MME.

The information about the configured dedicated paging carrier has been sent from eNB to MME in step 5 (e.g. before the UE has been released) and is send back from the MME to the eNB later-on (e.g. at after the UE enters connected mode again) in the paging request in step 8 above; this message may be included in the existing rel-13 information element (IE) npdcch-NumRepetitionPaging-r13 or may be appended (e.g. in form of a new rel-14 IE).

Examples of both of these options are described in turn below.

Option 1A—First Use of the 3GPP Rel-13 npdcch-NumRepetitionPaging-r13 IE

In embodiments where the eNB transfers the UE paging carrier information in a UEpagingcoverageinformation-NB message, the message may comprise an information element (IE) for storing information indicating both the (estimated) number of repetitions (e.g. the npdcch-NumRepetitionPaging-r13 IE) and the paging carrier information.

A solution not requiring any new parameter may be advantageous because the 3GPP Rel-13 npdcch-NumRepetitionPaging IE may only be useful for the eNB/cell where the UE was released/suspended (and it is highly unlikely that a granularity of 1 in the number of repetitions are needed; i.e. using the 2048 different available codepoints as defined in 3GPP Rel-13). An eNB implementation would likely not be able to (by link adaptation) determine the exact number of repetitions needed with a granularity of 1 repetition. In addition, the standard only allows a discrete number of repetition levels to be configured for the NPDCCH, and in Rel-13, 36.331, only 12 values are defined as shown below:

npdcch-NumRepetitionPaging-r13 ENUMERATED { r1, r2, r4, r8, r16, r32, r64, r128, r256, r512, r1024, r2048, spare4, spare3, spare2, spare1}

There is no feedback from the UE of the number of DL repetitions needed/used in Rel-13, and even if such feedback is introduced in Rel-14 or later, it is unlikely that a better granularity than, for example, 8 repetitions for values larger than r8 would be needed. Thus, there are (and will be) many codepoints from the already available 2048 in the npdcch-NumRepetitionPaging-r13 IE that could be used to indicate the paging carrier index (e.g., a value mapped to a carrier frequency) or the absolute frequency position of the carrier frequency that a UE was reconfigured to.

As one example, assume that 16 paging carriers could be configured in a NB-IoT cell (including both the anchor and the non-anchor carriers). Further, assume that the eNB uses only 16 different values for the number of repetitions (e.g. the 12 as defined for npdcch-NumRepetitionPaging-r13 from above and 4 additional, such as r24, r48, r96, r192). Then, by just using 256 codepoints (16*16=256), both the carrier information (e.g. carrier index and/or absolute frequency position) and the number of repetitions could be coded into the parameter. This may work as follows (but many other similar schemes could apply). The 16 used repetition values could be represented in an array: {r1, r2, r4, r8, r16, r24, r32, r48, r64, r96, r128, r192, r256, r512, r1024, r2048}, i.e., the index into the array gives the number of repetitions. If a certain UE is determined to need 96 repetitions then the table index of that is used (i.e., 9). Then if the eNB determines to use carrier index number 3 for a UE, the value signaled on the S1 from the eNB at release/suspend would be (9+3*16)=57. At the paging occasion, the eNB receives the value back from the MME as it signaled in (i.e. 57), and then performs a "mod 16"-operation to get the index to the number of repetitions and a "div 16"-operation to get the paging carrier index.

The above example will work in the case where the UE_ID is always known to the eNB, as then the paging carrier can be calculated for all UEs regardless of whether the paging carrier gets assigned by dedicated signaling (e.g. in the release/suspend in step 4 above). Then the eNB calculates and provides this value for all UEs and provides it to the MME (and receives it back at the paging occasion).

However, since the S-TMSI (or parts of it) will likely be used for the UE_ID and the eNB will not always know the exact value of the S-TMSI for an UE that it releases/suspends, the above coding may be adapted in a way to determine if a dedicated paging configuration was sent to the UE. This adaption can be done by extending the number of paging carrier indices by one, and letting one of indices mean "no paging carrier assigned by dedicated signaling." With this adaptation and continuing with the example above, 17 carrier indices are needed (256+16 codepoints used). Then, for example, index number zero may be used for UEs that selects a default carrier by UE_ID (i.e., no dedicated signaling is provided to the UE in release/suspend to use a second carrier). Then, all those UEs that select a default carrier by UE_ID will get a value between 0-15 (i.e. "div 16" equals zero for all UEs not being assigned a specific paging carrier by dedicated signalling).

Option 2A—Second Use of the 3GPP Rel-13 npdcch-NumRepetitionPaging-r13 IE

As an alternative to option 1A, the existing 11 bits (2048 code points) in the npdcch-NumRepetitionPaging-r13 IE may be split into sub fields for the number of repetitions and the carrier information (e.g., carrier index, absolute frequency position). For example, the IE may be split into a first sub field (e.g., 4 bits) for number of repetitions, a second sub field for paging carrier information (e.g., 4 bits), and optionally reserve a third subfield (e.g. 3 bits) for future use. The IE would then look like the below:

|NumRepetions (4 bits)|PagingCarrierIndex (4 bits)|Reserved|

This option may works well in solutions where there is a weighted non-uniform carrier distribution. For example, this option may offer the possibility to re-configure specific UEs to other paging carriers. In this way, the weights may be used to make more room for UEs in high CE-levels in selected carriers.

Option 2—Use of a New (e.g. Rel-14) Parameter to the UEpagingcoverageinformation-NB message New signaling may be introduced to indicate the carrier information (e.g. carrier index or absolute frequency position) by adding a new parameter or IE to the UEpagingcoverageinformation-NB message (see TS 36.331). For example, the UEPagingCoverageInformation-NB message may be modified by adding the underlined language noted below:

UEPagingCoverageInformation-NB Message

```
-- ASN1START
UEPagingCoverageInformation-NB ::= SEQUENCE {
criticalExtensions            CHOICE {
    c1                        CHOICE{
       uePagingCoverageInformation-r13      UEPagingCoverageInformation-NB-IEs,
       spare3 NULL, spare2 NULL, spare1 NULL
    },
    criticalExtensionsFuture        SEQUENCE { }
  }
}
UEPagingCoverageInformation-NB-IEs ::= SEQUENCE {
-- the possible value(s) can differ from those sent on Uu
   npdcch-NumRepetitionPaging-r13        INTEGER (1..2048) OPTIONAL,
   nonCriticalExtension                  UEPagingCoverageInformation-NB-IEs-v14 OPTIONAL
}
UEPagingCoverageInformation-NB-IEs-v14::=SEQUENCE{
   pagingCarrierIndex         INTEGER(1..16)OPTIONAL,
   nonCriticalExtension       SEQUENCE{}OPTIONAL
}
-- ASN1STOP
```

It should be understood that re-configuration of the paging carrier may be general in use and is not limited to assigning UEs based on CE. For example, the solution disclosed herein may be used to achieve load distribution similar to legacy re-direct but for carriers rather than cells.

If the same network configuration for anchor and non-anchor carriers is used for several cells in a network, the solution could of course be expanded such that the configured paging carrier is also valid in other cells, e.g. in an entire tracking-area (TA) or cluster of cells. In this case, the eNB may need to indicate to the UE in which cell(s) the paging carrier configuration is valid.

In an alternative embodiment, the eNB may re-configure the paging carrier of the UE when the UE responds to paging, i.e., the UE establishes an RRC connection and the establishment cause is set to Mobile Terminating (MT) Access. The eNB can then use the information in the MME paging request preceding the connection attempt to decide if the UE is a good candidate to re-direct to a different paging carrier. For example, a list of last visited cells in the paging request may be used to determine if the UE is stationary or mobile. The eNB may then only re-configure those UEs which are stationary.

Another possible embodiment of the solution is in the context of RRC Resume (UP optimization), in which case the paging carrier information does not necessarily need to be signaled to the MME but can be stored in the UE RRC resume context in eNB. (In this case there could therefore be no MME impact at all).

In the paging embodiment above (step 4d), it is feasible that the UE acknowledges the paging carrier change to the network in some way. This could be done, for example, in the first subsequent RRC connection establishment. Alternatively, a similar procedure as for SI update could be used; i.e. paging (possibly several times) under a given period (e.g. a "modification period") may be considered robust enough that an acknowledgement is not explicitly needed and the newly assigned paging carrier is taken in to use at a pre-determined point in time (e.g. a "modification period boundary," that is the end of the modification period in which the UE was notified about the change of paging carrier).

In an embodiment for the Data Over Nas (DoNAS) solution (CP optimization), the decision of the paging carrier to be used could instead be taken by the MME. This information could be appended to NAS signaling upon attach or tracking-area update (TAU). As above, paging the MME would include the paging carrier information for the UE if either the UE remains in the same cell, or if the entire TA (or cluster of cells) is using the same downlink carrier configuration.

The following portion is taken from a draft contribution for 3GPP TSG-RAN WG2 #95bis regarding Non-anchor carrier paging in NB-IoT.

One issue is whether or not paging carrier selection should be CE-level differentiated. That is, since UEs in the highest CE-level require quite many DL resources it could potentially be of interest to collect them in a non-anchor carrier. However, the drawbacks are quite severe, most importantly the eNB will not know in which carrier a certain UE is monitoring paging at a given time. This means that the eNB must "search" for the UE and page the UE with different numbers of repetitions in different carriers. If the UE meanwhile has changed CE-level, and hence paging carrier, there is no way for the eNB to conclude whether the UE is in the cell or not. If instead the UE always resides in a known paging carrier, the eNB could ensure that the UE is reached if it uses the maximum number of repetitions for NPDCCH.

If it however is desired to put UEs in the highest CE-level in e.g. a power boosted DL to consume less system resources and improve battery life for these UEs, it could equally well be achieved by dedicated RRC re-configuration. That is, UEs are assigned a certain paging carrier based on UE_ID upon entering the cell but can later be re-configured to another paging carrier by the eNB.

A comparison of these two alternatives providing CE-level differentiated paging over NB-IoT carriers is given below.

Dedicated RRC Re-Configuration.

Pros: (i) eNB always knows which carrier a UE is monitoring paging in, if it remains in the same cell, and can (in principle) always reach it by paging with the maximum number of configured repetitions. (ii) Simple add-on to UE_ID based distribution giving the benefits of individual configuration. (iii) Solution only used if needed or desired. (iv) Provides full network control if the paging distribution needs to be done on other basis than CE-level. (i.e. future needs or unforeseen use-cases). Cons: (i) Not applicable before the first RRC Connected session in a cell (however this should have negligible impact on battery life for stationary UEs). (ii) Paging in all CE-levels must be supported on all carriers. However, unlike NPRACH, paging only uses time- and frequency-resources when UEs are actually paged. Paging load is not a problem since it can be controlled by setting the appropriate weights. (Furthermore, UEs in high CE-levels can quickly be re-configured to another carrier if desired.)

SI-Based UE Distribution.

SI distribution may refer to achieving uneven paging load distribution in a controlled way by applying weights on the carriers (broadcasted on SI) for the eMTC expression for calculating a UE's paging carrier. Pros: (i) Applicable already upon entering a cell. (ii) Paging in all CE-levels does not have to be supported on all carriers. Cons: (i) More complex solution (unclear how paging selection should be done when not based on UE_ID). (ii) eNB does not know in which carrier a UE is in and locating it may require a search process over carriers (i.e. more difficult to conclude on whether the UE is located in the cell or not). (iii) Unnecessarily might introduce unforeseen problems since it is more different from the legacy procedure (e.g. if the UE changes CE-level during paging etc.)

Given the above pros and cons, and the fact that through the use of weights the problem of configuring the paging load per carrier load as desired may be solved, it is proposed to not have CE-level differentiated paging carrier selection but instead have the possibility to override the selection based on UE_ID through RRC re-configuration if needed.

FIG. 1 illustrates an exemplary Narrowband Internet of Things (NB-IoT) wireless communications system according to some embodiments. The NB-IoT system 100 may comprise a UE 105, a base station 110 (e.g., eNB), and a Mobility Management Entity (MME) 105 in core network 130. In some embodiments, a plurality of available paging carriers may be available for the UE. For ease of illustration, two available paging carriers 115A-B are shown in FIG. 1 between the UE 105 and the BS 110. For example, in some embodiments, paging carrier 115A may be a paging carrier selected by the UE based on a UE_ID, as described above. In some embodiments, paging carrier 115B may be a second, different paging carrier from 115A, e.g., selected by the base station eNB 110 as described above. In some embodiments, base station/eNB 110 may be in electronic communication with one or more network nodes in core network 130, such as a MME 120.

Figure 2:
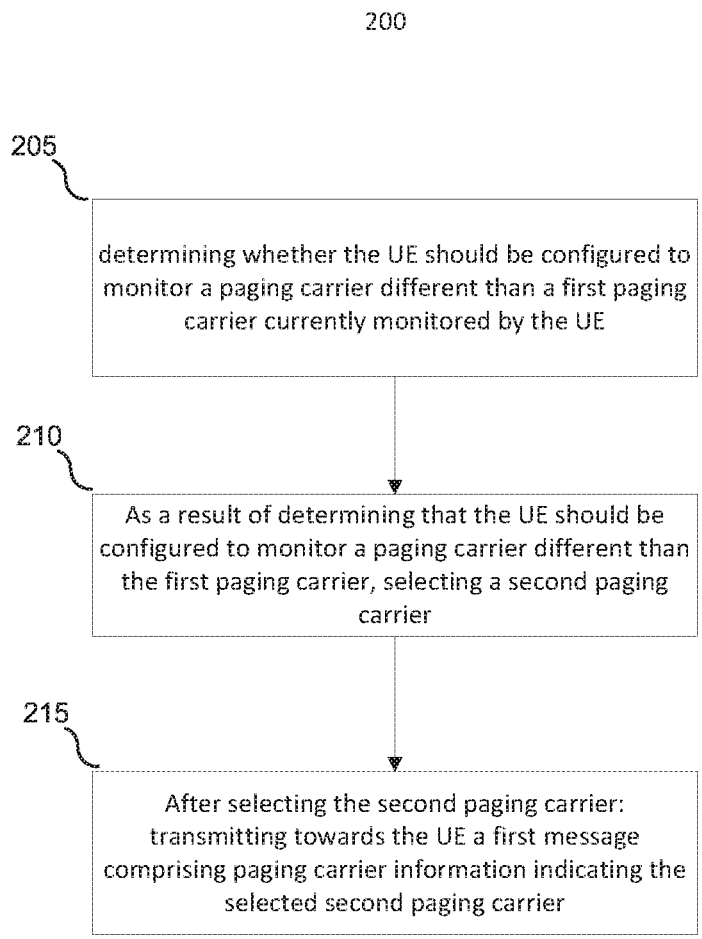
FIG. 2 illustrates an exemplary flow chart according to some embodiments.

FIG. 2 illustrates an exemplary flow chart according to some embodiments. In preferred embodiments, process 200 is performed by a first network node, such as an eNB 110, MME or other network node. Process 200 may be used for assigning to a UE a paging carrier. At step 205, the first network node determines whether the UE should be configured to monitor a paging carrier different than a first paging carrier currently monitored by the UE (the first paging carrier may have been selected by the UE (or selected by a network node) based on a UE_ID for identifying the UE). At step 210, as a result of determining that the UE should be configured to monitor a paging carrier different than the first paging carrier, the first network node selects a second paging carrier. At step 215, after selecting the second paging carrier, the first network node transmits towards the UE a first message comprising paging carrier information indicating the selected second paging carrier.

In some embodiments, the determining step 205 may be performed in response to receiving a connection message (e.g., an RRC Connection Request, RRC Connection Resume Request, RRC Connection Re-establishment Request) transmitted by the UE. In some embodiments, the first message of step 215 may be one of: a connection setup message (e.g., an RRC Connection Setup), a connection reconfiguration message (e.g., RRC Connection Reconfiguration), a resume message (e.g. RRC Connection Resume), a connection re-establishment message (e.g., RRC Connection Re-establish), a message for causing the UE to transition to an idle state (e.g., an RRC Connection Release), and a page for the UE.

In some embodiments, process 200 may further include a step of, after selecting the second paging carrier in step 210, the first network node (e.g., eNB) transmits to a second network node (e.g., a MME), a second message comprising paging carrier information indicating the selected second paging carrier.

In some embodiments, the second message may be a message for conveying UE paging information, e.g. a UE paging coverage information such as a UEpagingcoverage-information-NB. The second message may comprise an information element (IE) indicative of an (estimated) number of repetitions for NPDCCH messages for paging (e.g., the npdcch-NumRepetitionPaging-r13 IE), and the paging carrier information is included in that IE. In some embodiments, the IE may encode both the number of repetitions and the paging carrier information. In some embodiments, the IE may consist of a set of 11 bits, where a first subset of the 11 bits (e.g., 4 bits of the 11 bits) is used to encode the number of repetitions, and a second subset of the 11 bits (e.g., different 4 bits of the 11 bits) is used to encode the paging carrier information.

In some alternative embodiments, the second message may comprise a first information element (IE) for storing information indicating a number of repetitions (e.g., the npdcch-NumRepetitionPaging-r13 IE), and a second IE distinct from the first IE for storing the paging carrier information.

In some embodiments, the first network node receives a paging request transmitted by the second network node, the paging request comprising the paging carrier information that was transmitted to the second network node. The first network node may extract from the paging request the paging carrier information. The first network node may further page the UE using the paging carrier indicated by the extracted paging carrier information (e.g., the first network node transmits a paging message on a downlink control channel (e.g., NPDSCH) on the indicated carrier).

Figure 3:
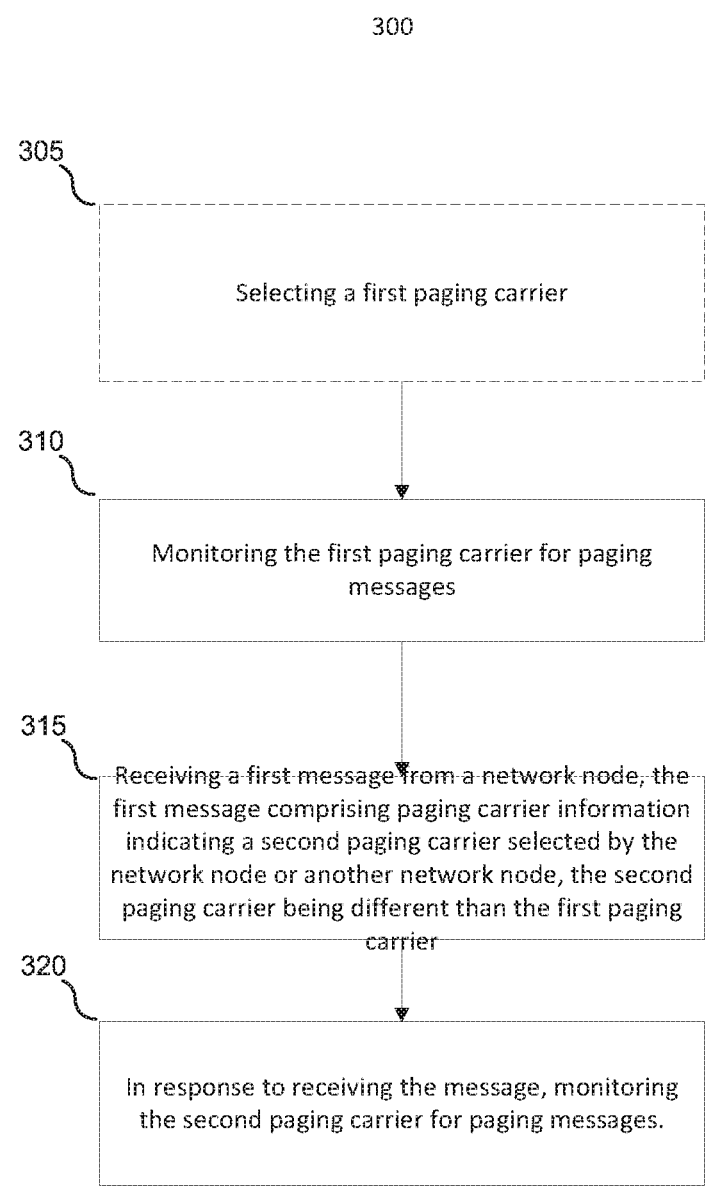
FIG. 3 illustrates an exemplary flow chart according to some embodiments.

FIG. 3 illustrates an exemplary flow chart according to some embodiments. In preferred embodiments, process 300 is performed by a UE 105 for configuring a paging carrier. In step 305 (optional), the UE selects a first paging carrier (the paging carrier selection may be based on the UE's UE_ID). In step 310, the UE monitors the first paging carrier for paging messages. In step 315, the UE receives a first message (e.g., an RRC message) transmitted by a network node (e.g., eNB), the first message comprising paging carrier information indicating a second paging carrier selected by the network node, the second paging carrier being different than the first paging carrier. In step 320, in response to receiving the message, the UE monitors the second paging carrier for paging messages.

In some embodiments, the UE, prior to receiving the first message, triggers the first network node to determine whether the first network node should select a second paging carrier for the UE. In some embodiments, the triggering step may comprise the UE transmitting to the first network node a connection message (e.g., an RRC Connection Request, RRC Connection Resume Request, RRC Connection Re-establishment Request, etc.), and the first message was transmitted by the first network node in response to the connection message.

In some embodiments, the first message of step 315 may be one of: a connection setup message (e.g., an RRC Connection Setup), a connection reconfiguration message (e.g., RRC Connection Reconfiguration), message for causing the UE to transition to an idle state (e.g., an RRC Connection Release), a resume message (e.g., RRC Connection Resume), a connection re-establishment message (e.g., RRC Connection Re-establish), and a page for the UE. In some embodiments, the first paging carrier is an anchor carrier and the second paging carrier is a non-anchor carrier.

Figure 4:
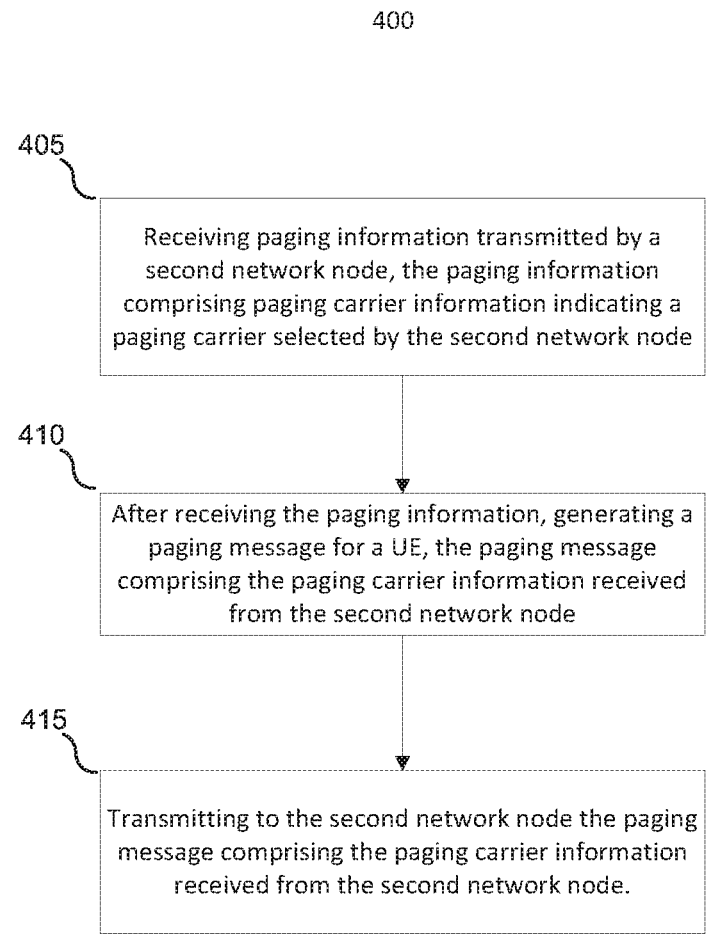
FIG. 4 illustrates an exemplary flow chart according to some embodiments.

FIG. 4 illustrates an exemplary flow chart according to some embodiments. In some embodiments, process 400 is performed by a network node (e.g., an eNB/BS 110) for paging a user equipment on a paging carrier selected by a second network node (e.g., a MME 120). In step 405, the network node receives paging information transmitted by the second network node, the paging information comprising paging carrier information indicating a paging carrier selected by the second network node for an identified UE. The paging information may be transmitted by the second network node using a message containing paging coverage information (e.g. in form of a UEpagingcoverageinformation-NB information element). In step 410, after the paging information is received, a paging message is generated for the identified UE, the paging message comprising the paging carrier information received from the second network node. In step 416, the paging message comprising the paging carrier information received from the second network node is transmitted to the second network node.

In some embodiments, the paging information is provided in a message, the message comprising an information element (IE) for storing information indicating a number of repetitions (e.g., the npdcch-NumRepetitionPaging-r13 IE), and the paging carrier information is included in the IE. In some embodiments, the IE encodes both the number of repetitions and the paging carrier information. In some embodiments, the IE consists of a set of 11 bits, where a first subset of the 11 bits (e.g., 4 bits of the 11 bits) is used to encode the number of repetitions, and a second subset of the 11 bits (e.g., a different 4 bits of the 11 bits) is used to encode the paging carrier information. In some embodiments, the message comprising the paging information comprises: (i) a first information element (IE) for storing information indicating a number of repetitions (e.g., the npdcch-NumRepetitionPaging-r13 IE), and (ii) a second IE distinct from the first IE for storing the paging carrier information.

Figure 5:
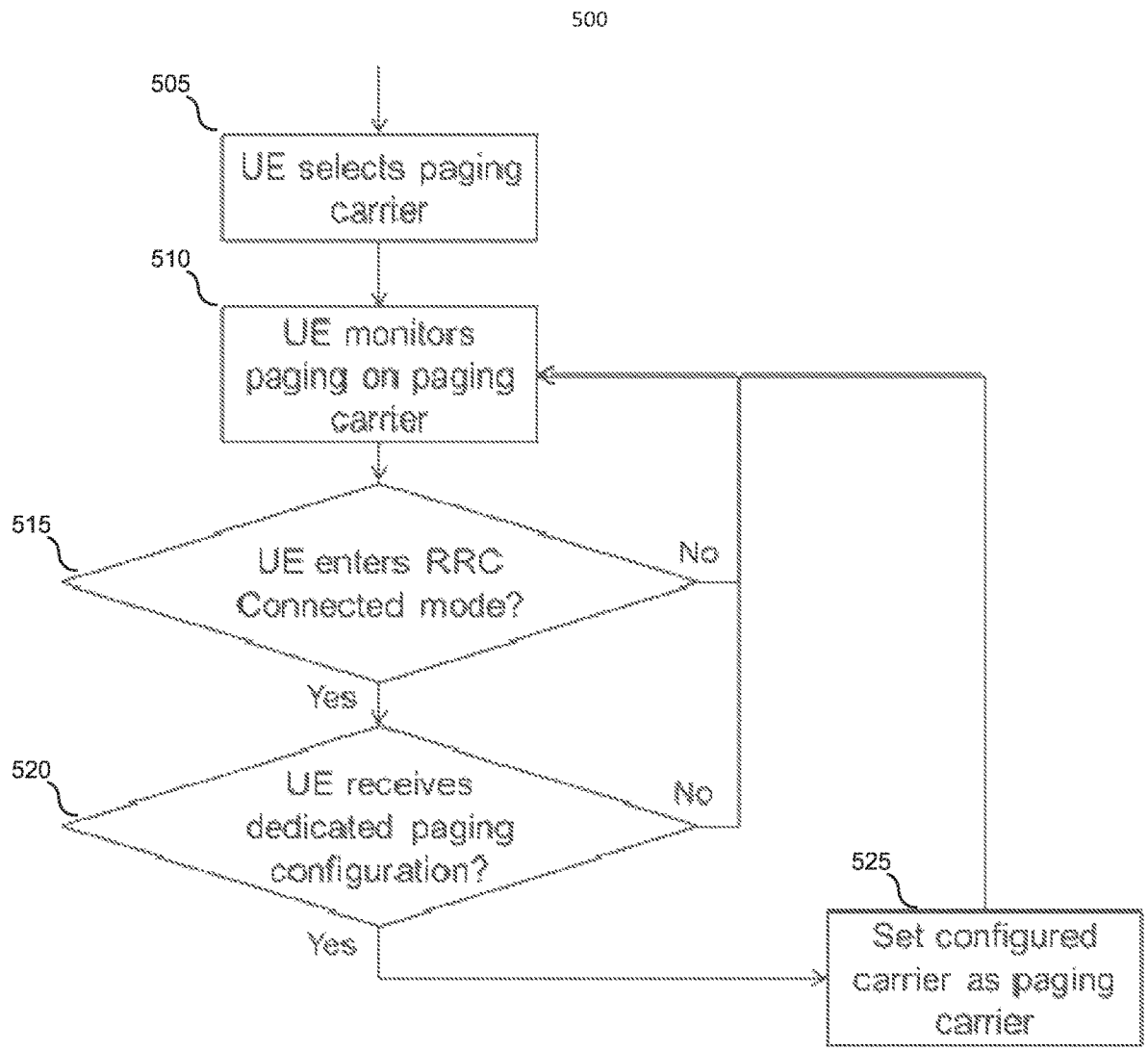
FIG. 5 illustrates an exemplary flow chart according to some embodiments.

FIG. 5 illustrates an exemplary flow chart according to some embodiments. In some embodiments, process 500 is performed by a UE 105. In step 505, the UE selects a paging carrier. In step 510, the UE monitors paging on the selected paging carrier. In step 515, the UE determines if it has entered RRC connected mode. If yes, then in step 520 the UE determines if it received a dedicated paging configuration. If yes, then in step 525 the UE sets the configured carrier as the paging carrier. If the UE determines that it has not entered RRC connected mode in step 515 or has not received a dedicated paging configuration in step 520, then the UE continues to monitor paging on the paging carrier in step 510.

Figure 6:
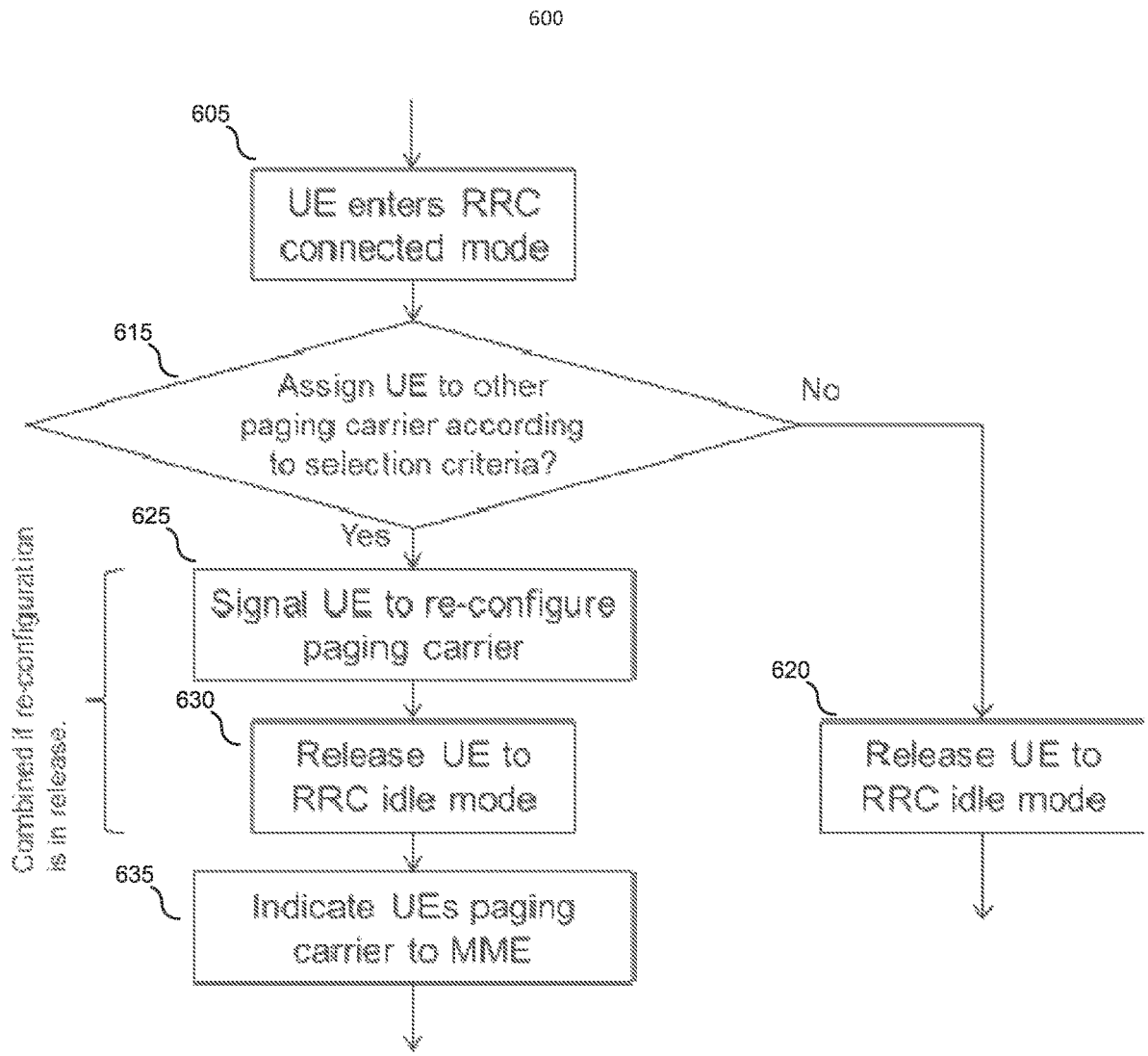
FIG. 6 illustrates an exemplary flow chart according to some embodiments.

FIG. 6 illustrates an exemplary flow chart according to some embodiments. In step 605, the UE enters RRC connected mode. In step 615, a network node determines whether to assign the UE to a different paging carrier according to selection criteria. If the determination in step 615 is no, then in step 620 the UE is released to a RRC idle mode. If the determination in step 615 is yes, then in step 625 a signal is sent towards the UE to re-configure a paging carrier (this is same as step 215). In step 630, the UE is released to RRC idle mode. In step 635, the UE's paging carrier is indicated to the MME 120.

Figure 7:
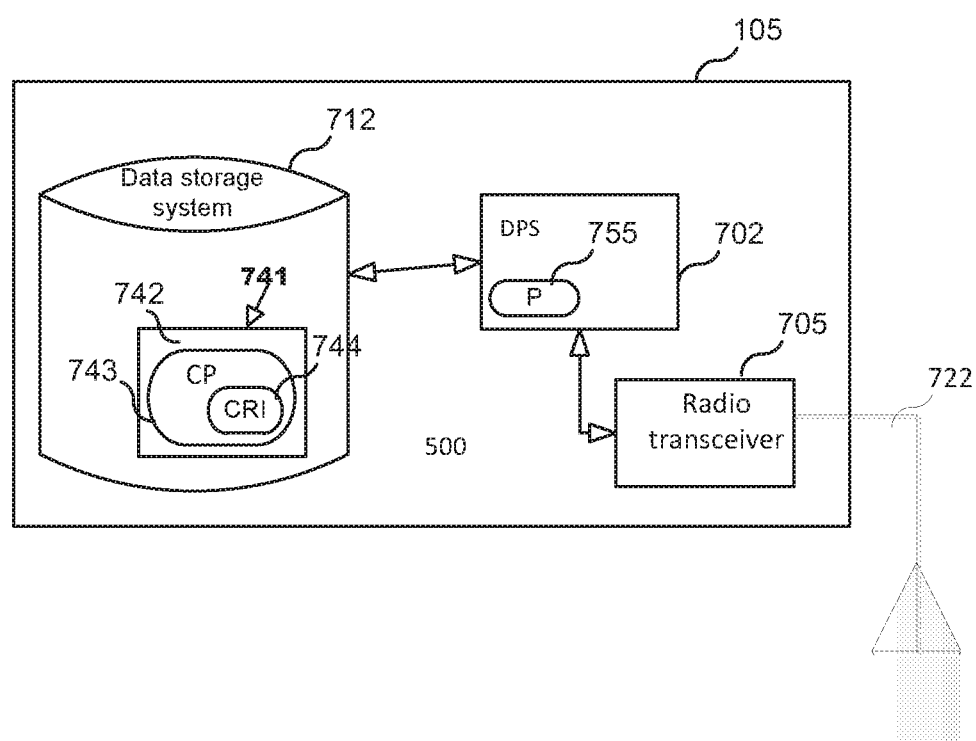
FIG. 7 is a block diagram of a UE node according to some embodiments.

FIG. 7 is a block diagram of a UE node according to some embodiments. The UE node 105. As shown in FIG. 7, UE 105 may comprise: a data processing system (DPS) 702, which may include one or more processors 755 (e.g., a general purpose microprocessor and/or one or more other data processing circuits, such as an application specific integrated circuit (ASIC), field-programmable gate arrays (FPGAs), and the like); a radio transceiver 705 coupled to an antenna 722 for use in wirelessly communicating with a radio access network (RAN) node (e.g., eNB); and local storage unit (a.k.a., "data storage system") 712, which may include one or more non-volatile storage devices and/or one or more volatile storage devices (e.g., random access memory (RAM)). In embodiments where UE 105 includes a general-purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited to, magnetic media (e.g., a hard disk), optical media (e.g., a DVD), memory devices (e.g., random access memory), and the like. In some embodiments, the CRI 744 of computer program 743 is configured such that when executed by data processing system 702, the CRI causes the UE 105 to perform steps described above (e.g., steps described above with reference to the flow charts). In other embodiments, UE 105 may be configured to perform steps described herein without the need for code. That is, for example, data processing system 702 may consist merely of one or more ASICs. Hence, the features of the embodiments described herein may be implemented in hardware and/or software.

Figure 8:
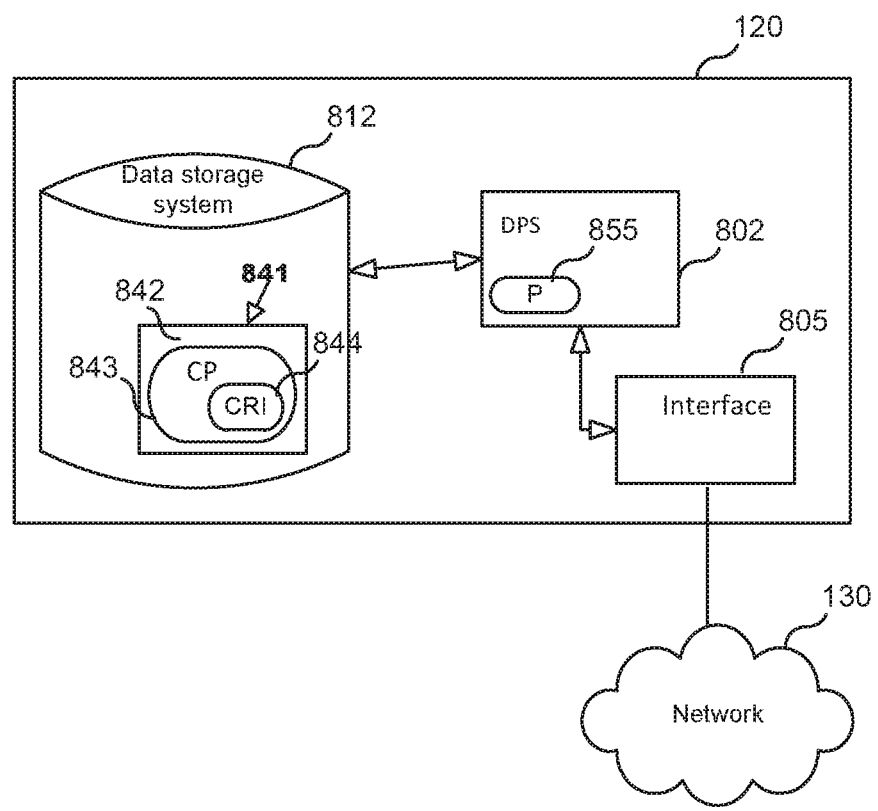
FIG. 8 is a block diagram of a MME node according to some embodiments.

FIG. 8 is a block diagram of a MME node according to some embodiments. As shown in FIG. 8, MME 120 may comprise: a data processing system (DPS) 802, which may include one or more processors 855 (e.g., a general purpose microprocessor and/or one or more other data processing circuits, such as an application specific integrated circuit (ASIC), field-programmable gate arrays (FPGAs), and the like); a network interface 805 for use in connecting MME 120 to a network 130 so that the MME can communicate with other nodes connected (directly or indirectly) to the network; and local storage unit (a.k.a., "data storage system") 812, which may include one or more non-volatile storage devices and/or one or more volatile storage devices (e.g., random access memory (RAM)). In embodiments where MME 120 includes a general-purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes the MME 120 to perform steps described above (e.g., steps described above with reference to the flow charts). In other embodiments, MME 120 may be configured to perform steps described herein without the need for code. That is, for example, data processing system 802 may consist merely of one or more ASICs. Hence, the features of the embodiments described herein may be implemented in hardware and/or software.

Figure 9:
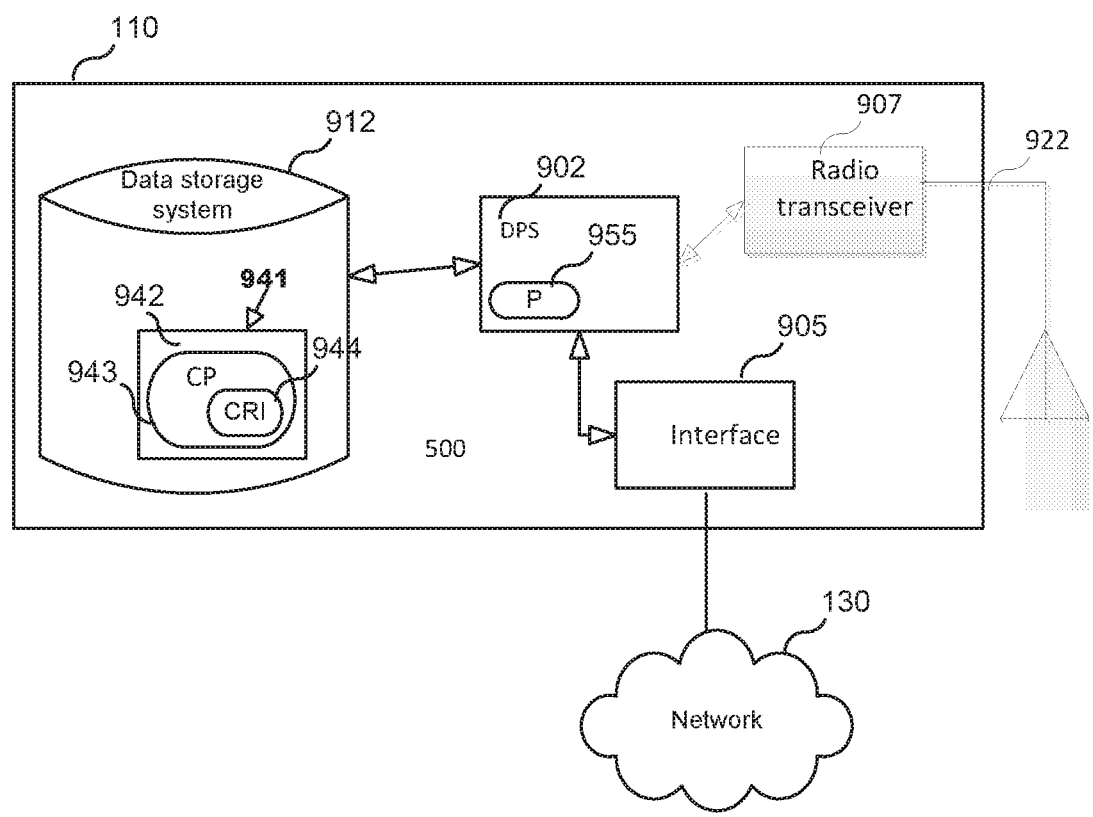
FIG. 9 is a block diagram of an eNB node according to some embodiments.

FIG. 9 is a block diagram of a eNB node according to some embodiments. As shown in FIG. 9, eNB 110 may comprise: a data processing system (DPS) 902, which may include one or more processors 955 (e.g., a general purpose microprocessor and/or one or more other data processing circuits, such as an application specific integrated circuit (ASIC), field-programmable gate arrays (FPGAs), and the like); a network interface 905 for use in connecting eNB 110 to network 130; a radio transceiver 907 coupled to an antenna 922 for use in wirelessly communicating with UEs; and local storage unit (a.k.a., "data storage system") 912, which may include one or more non-volatile storage devices and/or one or more volatile storage devices (e.g., random access memory (RAM)). In embodiments where eNB 110 includes a general-purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media (e.g., a DVD), memory devices (e.g., random access memory), and the like. In some embodiments, the CRI 944 of computer program 943 is configured such that when executed by data processing system 902, the CRI causes the eNB 120 to perform steps described above (e.g., steps described above with reference to the flow charts). In other embodiments, eNB 120 may be configured to perform steps described herein without the need for code. That is, for example, data processing system 902 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

In the following, various further embodiments are described:

Network Node Embodiment

E1. A method in a first network node (e.g., an eNB, MME, etc.) for assigning to a user equipment (UE) a paging carrier, the method comprising:

the first network node determining whether the UE should be configured to monitor a paging carrier different than a first paging carrier;

as a result of determining that the UE should be configured to monitor a paging carrier different than the first paging carrier, the first network node selecting a second paging carrier; and after selecting the second paging carrier:

the first network node transmitting towards the UE a first message comprising paging carrier information (e.g., a paging carrier index, absolute frequency position) indicating the selected second paging carrier.

E2. The method of embodiment E1, wherein the method further comprises receiving a connection message (e.g., an RRC Connection Request, RRC Connection Resume Request, RRC Connection Re-establishment Request) transmitted by the UE, and the determining step is performed in response to receiving the connection message.

E3. The method of any one of embodiments E1-E2, wherein the first message is one of: a connection setup message (e.g., an RRC Connection Setup), a connection reconfiguration message (e.g., RRC Connection Reconfiguration), a message for causing the UE to transition to an idle state (e.g., an RRC Connection Release), a message for re-establishing a connection (e.g., RRC Connection Re-establishment), a connection resume message (e.g., RRC Connection Resume), and a page for the UE.

E4. The method of any one of embodiments E1-E3, further comprising:

after selecting the second paging carrier, the first network node transmitting to a second network node (e.g., an MME) a second message comprising paging carrier information indicating the selected second paging carrier.

E5. The method of embodiment E4, wherein the second message is a message for conveying UE paging information (e.g., a UEpagingcoverageinformation-NB).

E6. The method of embodiment E5, wherein the second message is one of a UE CONTEXT RELEASE COMPLETE, a UE CONTEXT SUSPEND REQUEST.

E7. The method of embodiment E5, wherein the second message comprises an information element (IE) for storing information indicating a number of repetitions (e.g., the npdcch-NumRepetitionPaging-r13 IE), and the paging carrier information is included in said IE.

E8. The method of embodiment E7, wherein the IE encodes both the number of repetitions and the paging carrier information.

E9. The method of embodiment E7, wherein the IE consists of a set of 11 bits, a first subset of the 11 bits (e.g., 4 bits of the 11 bits) is used to encode the number of repetitions, and a second subset of the 11 bits (e.g., a different 4 bits of the 11 bits) is used to encode the paging carrier information.

E10. The method of embodiment E5, wherein the second message comprises:

a first information element (IE) for storing information indicating a number of repetitions (e.g., the npdcch-NumRepetitionPaging-r13 IE), and a second IE distinct from the first IE for storing the paging carrier information.

E11. The method of any one of embodiments E4-E10, further comprising:

the first network node receiving a paging request transmitted by the second network node, the paging request comprising the paging carrier information that was transmitted to the second network node;

the first network node extracting from the paging request the paging carrier information; and the first network node paging the UE using the paging carrier indicated by the extracted paging carrier information (e.g., the first network node transmits a paging message on a downlink control channel (e.g., NPDSCH) on the indicated carrier).

E12. The method of embodiment E11, wherein the paging request is a PAGING message.

E13. The method of any of embodiments E1-E12, wherein the first network node is a base station node (e.g., an eNB).

E14. The method of embodiment E13, further comprising: the first network node storing the paging carrier information.

E15. The method of embodiment E14, further comprising: the first network node receiving a paging message for the UE; and the first network node, in response to the paging message, retrieving the stored paging carrier information based on a UE identifier included in the paging message.

E16. The method of any one of embodiments E1-E15, wherein the first network node is a Mobility Management Entity (MME) node, and the step of transmitting the first message towards the UE comprises the MME transmitting the first message to a base station for forwarding to the UE.

E17. The method of any one of embodiments E1-E16, wherein the determining is based on one or more of the following:
- downlink power boosting applied for a carrier,
- whether a carrier is a non-anchor or anchor carrier,
- whether the carrier is in-band, guard-band or stand-alone,
- the UE's coverage enhancement level (CE-level),
- repetition level of the UE,
- a category of the UE,
- a capability of the UE,
- a history of the UE,
- a statistic of the UE,
- a current load situation on downlink carriers,
- a current distribution of one or more UEs over carriers, and
- an identifier of the UE.

E18. The method of embodiment E17, wherein the determining is based on the CE-level.

E19. The method of any of embodiments E1-E18, wherein the first message further comprises an indication as to a set of one or more cells for which the paging carrier information is valid (e.g., the first message may include tracking-area (TA) identifier for identifying a TA or information for identifying a cluster of cells).

UE Embodiment

E19. A method in a user equipment (UE) for configuring a paging carrier, the method comprising:

the UE monitoring a first paging carrier (e.g., a paging carrier selected by the UE) for paging messages;

the UE receiving a first message from a network node, the first message comprising paging carrier information indicating a second paging carrier selected by the network node or another network node, the second paging carrier being different than the first paging carrier; and in response to receiving the message, the UE monitoring the second paging carrier for paging messages.

E20. The method of embodiment E19, wherein the method further comprises the UE, prior to receiving the first message, triggering the first network node to determine whether the first network node should select a second paging carrier for the UE.

E21. The method of embodiment E20, wherein the triggering step comprises the UE transmitting to the first network node a connection message (e.g., an RRC Connection Request, RRC Connection Resume Request, RRC Connection Re-establishment Request), and the first message was transmitted by the first network node in response to the connection message.

E22. The method of any one of embodiments E19-E21, wherein the first message is one of: a connection setup message (e.g., an RRC Connection Setup), a connection reconfiguration message (e.g., RRC Connection Reconfiguration), a message for causing the UE to transition to an idle state (e.g., an RRC Connection Release), a message for causing the UE to re-establish a connection (e.g. RRC Connection Re-establishment), a connection resume message (e.g., RRC Connection Resume) and a page for the UE.

E22. The method according to any one of embodiments E19-E22, further comprising: selecting the first paging carrier based on an identifier of the UE (UE_ID) (e.g., UE's IMSI or other identifier).

E23. The method according to embodiment E22, wherein the UE selects the first paging carrier based on the UE_ID.

MME Embodiment

E24. A method in a first network node (e.g., an MME) for paging a user equipment (UE) on a paging carrier selected by a second network node (e.g., eNB), the method comprising:

the first network node receiving paging information (e.g., a message containing UEpagingcoverageinformation-NB) transmitted by the second network node, the paging information comprising paging carrier information (e.g., a paging carrier index, absolute frequency position) indicating a paging carrier selected by the second network node;

after receiving the paging information, generating a paging message for the UE, said paging message comprising the paging carrier information received from the second network node; and transmitting the paging message comprising the paging carrier information.

E25. The method of embodiment E24, wherein the paging information comprises an information element (IE) for storing information indicating a number of repetitions (e.g., the npdcch-NumRepetitionPaging-r13 IE), and the paging carrier information is included in said IE.

E26. The method of embodiment E25, wherein the IE encodes both the number of repetitions and the paging carrier information.

E27. The method of embodiment E26, wherein the IE consists of a set of 11 bits, a first subset of the 11 bits (e.g., 4 bits of the 11 bits) is used to encode the number of repetitions, and a second subset of the 11 bits (e.g., a different 4 bits of the 11 bits) is used to encode the paging carrier information.

E28. The method of embodiment E24, wherein the paging information is contained in a message, the message comprising:

a first information element (IE) for storing information indicating a number of repetitions (e.g., the npdcch-NumRepetitionPaging-r13 IE), and a second IE distinct from the first IE for storing the paging carrier information.

E29. The method of embodiment E24, wherein the paging information is contained in a message, wherein the message is a CONTEXT RELEASE COMPLETE message or a UE CONTEXT SUSPEND REQUEST message.

E30. A first network node (e.g., a base station, a MME, etc.) configured to perform the method of claim 1.

E31. A user equipment (UE) configured to perform the method of embodiment E19.

E32. A second network node (e.g., a MME) configured to perform the method of embodiment 24.

The invention claimed is:

1. A method, performed in a network node, for assigning a paging carrier to a user equipment (UE), wherein the UE is configured to monitor a first paging carrier, the method comprising the network node:
    determining whether the UE should be configured to monitor a paging carrier different than the first paging carrier, or receiving a paging request from a further network node, wherein the paging request is indicative of a paging carrier different than the first paging carrier;
    selecting a second paging carrier; and
    transmitting, towards the UE and after selecting the second paging carrier, a message comprising paging carrier information indicating the selected second paging carrier; and
    transmitting, to the further network node, a further message comprising paging carrier information indicating the selected second paging carrier for the UE.

2. The method of claim 1:
    further comprising receiving a connection message transmitted by the UE; and
    wherein the determining is performed in response to receiving the connection message.

3. The method of claim 1, wherein the message is one of:
    a connection setup message;
    a connection reconfiguration message;
    a message for causing the UE to transition to an idle state;
    a message for re-establishing a connection;
    a connection resume message; and
    a page for the UE.

4. The method of claim 1, wherein the further message is a message for conveying UE paging information.

5. The method of claim 4, wherein the further message is one of:
    a UE CONTEXT RELEASE COMPLETE, and
    a UE CONTEXT SUSPEND REQUEST.

6. The method of claim 5:
    wherein the further message comprises an Information Element (IE) for storing information indicating a number of repetition; and
    wherein the paging carrier information is included in the IE.

7. The method of claim 6, wherein the IE encodes both the number of repetitions and the paging carrier information.

8. The method of claim 6:
    wherein the IE consists of a set of eleven bits;
    wherein a first subset of the eleven bits is used to encode the number of repetitions; and
    wherein a second subset of the eleven bits is used to encode the paging carrier information.

9. The method of claim 4, wherein the further message comprises:
    a first Information Element (IE) for storing information indicating a number of repetitions, and a second IE distinct from the first IE for storing the paging carrier information.

10. The method of claim 1, further comprising the network node:
    extracting the paging carrier information and a UE identifier from the paging request; and
    paging the UE associated with the UE identifier using the paging carrier indicated by the extracted paging carrier information.

11. The method of claim 1, wherein the network node is a base station node.

12. The method of any claim 1, wherein the further network node is a Mobility Management Entity (MME) node.

13. The method of claim 1, wherein the determining is based on:
    downlink power boosting applied for a carrier;
    whether a carrier is a non-anchor or anchor carrier;
    whether the carrier is in-band, guard-band or stand-alone;
    the UE's coverage enhancement level;
    repetition level of the UE;
    a category of the UE;
    a capability of the UE;
    a history of the UE;
    a statistic of the UE;
    a current load situation on downlink carriers;
    a current distribution of one or more UEs over carriers; and/or
    an identifier of the UE.

14. The method claim 1, wherein the message further comprises an indication as to a set of one or more cells for which the paging carrier information is valid.

15. A network node adapted assign a paging carrier to a user equipment (UE), wherein the UE is configured to monitor a first paging carrier, the network node comprising:
    processing circuitry;
    memory containing instructions executable by the processing circuitry whereby the network node is operative to:
        determine whether the UE should be configured to monitor a paging carrier different than the first paging carrier, or receive a paging request from a further network node; wherein the paging request is indicative of a paging carrier different than the first paging carrier;
        select a second paging carrier;
        transmit, towards the UE and after selecting the second paging carrier, a message comprising paging carrier information indicating the selected second paging carrier; and
        transmit, to a further network node, a further message comprising paging carrier information indicating the selected second paging carrier for the UE.

* * * * *